Oct. 5, 1954 J. J. Z. VAN ZELST 2,691,103

CIRCUIT-ARRANGEMENT FOR CONTROLLING THE AMPLITUDE AND THE FREQUENCY OF AN ELECTRICAL OSCILLATION

Filed Aug. 2, 1948 2 Sheets-Sheet 1

JOHANNES JACOBUS ZAALBERG VAN ZELST
INVENTOR

BY Theo. M Vogel
AGENT

INVENTOR
JOHANNES JACOBUS ZAALBERG VAN ZELST

BY Theo M Vogel
AGENT

Patented Oct. 5, 1954 2,691,103

UNITED STATES PATENT OFFICE 2,691,103

CIRCUIT-ARRANGEMENT FOR CONTROLLING THE AMPLITUDE AND THE FREQUENCY OF AN ELECTRICAL OSCILLATION

Johannes Jacobus Zaalberg van Zelst, Eindhoven, Netherlands, assignor to Hartford National Bank and Trust Company, Hartford, Conn., as trustee Application August 2, 1948, Serial No. 41,925

Claims priority, application Netherlands August 25, 1947

6 Claims. (Cl. 250—36)

Figure 1:
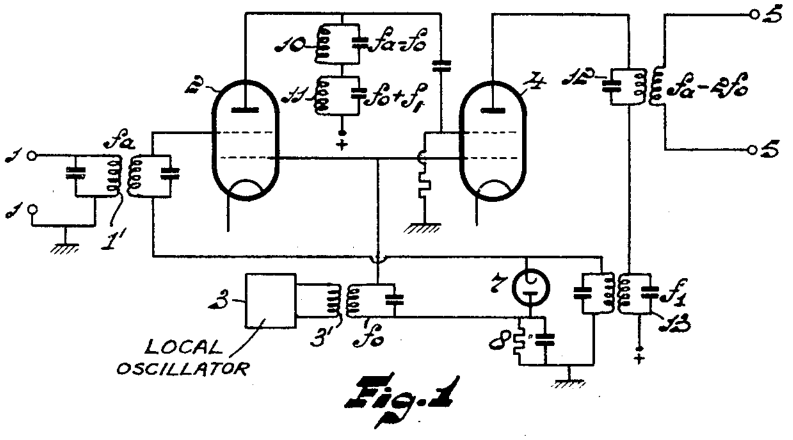

This invention relates to a circuit-arrangement for controlling the amplitude and the frequency of an electrical oscillation as a function of the amplitude and the frequency of at least one other electrical oscillation (control oscillation).

An object of the invention is to provide a circuit to convert the control-oscillation and exhibiting a constant conversion slope. Consequently, an electrical oscillation is produced, the amplitude of which is proportional to that of the control-oscillation and independent of undue variations in the conversion slope of the mixing stages used in the arrangement and the frequency of which differs by a constant amount from that of the control-oscillation.

A further object of the circuit-arrangement according to the invention is to provide improved means for mixing and limiting the control-oscillation. In this case the amplitude of the oscillation produced is independent of the amplitude of the control-oscillation (whilst it may, at the same time, be independent of undue variations in the conversion slope of the mixing stages used in the arrangement) the frequency of the oscillation produced varying linearly with that of the control-oscillation.

A third use of the circuit-arrangement according to the invention consists in discriminating the control-oscillation, for example modulated in frequency. In this case the amplitude modulation of the oscillation produced is independent of that of the control-oscillation and, for example, proportional to the frequency modulation of this oscillation, whereas the frequency of the oscillation produced varies linearly with that of the control-oscillation and is, more particularly, constant.

A fourth use of the circuit-arrangement according to the invention consists in positive or negative backcoupling in frequency of the control-oscillation. In this case the frequency of the oscillation produced varies linearly with the frequency of the control-oscillation.

The circuit-arrangement according to the invention exhibits the characteristic that it comprises at least two mixing stages, to the first of which is supplied not only the control-frequency $f_a$ but also at least one other frequency (auxiliary frequency $f_1$), the output of this mixing stage having derived from it at least one mixing frequency varying with the auxiliary frequency and being supplied to the second mixing stage together with an oscillation of a frequency such that an oscillation of the same frequency as the auxiliary frequency $f_1$ is produced in the output of the second mixing stage, a self-oscillating back-coupling for the auxiliary frequency $f_1$ being provided between the output of the second and the input of the first mixing stage.

As regards a circuit-arrangement for converting electrical oscillations in which the conversion slope is maintained constant, the invention utilises the principle that a control voltage may be derived from an auxiliary oscillation passing through an amplifying arrangement similarly to an oscillation to be amplified by comparison of the amplitude of the auxiliary oscillation produced at the output of the arrangement with the input amplitude, said contol-voltage readjusting in the correct manner the mutual conductance of the amplifying circuit-arrangement. As a rule, after applying this principle to a conversion circuit-arrangement, the frequency of the auxiliary oscillation at the output of the arrangement will be different from that at the input of the arrangement. The invention, however, has for its object to provide a circuit-arrangement comprising self-oscillating back-coupling of the auxiliary oscillation.

There is known per se a circuit-arrangement for converting electrical oscillations in which the amplitude of the converted oscillations is substantially independent of that of the input oscillation. This circuit-arrangement is based on the fact that the conversion slope of the mixing stage exhibits a saturation characteristic curve at high values of the amplitude of the input oscillation. The circuit-arrangement according to the invention for mixing and limiting electrical oscillations, however, may be employed with equal advantage if the input oscillation exhibits a small amplitude.

The invention will now be explained more fully with reference to the accompanying drawing showing, by way of example, a few embodiments thereof.

Figure 2:
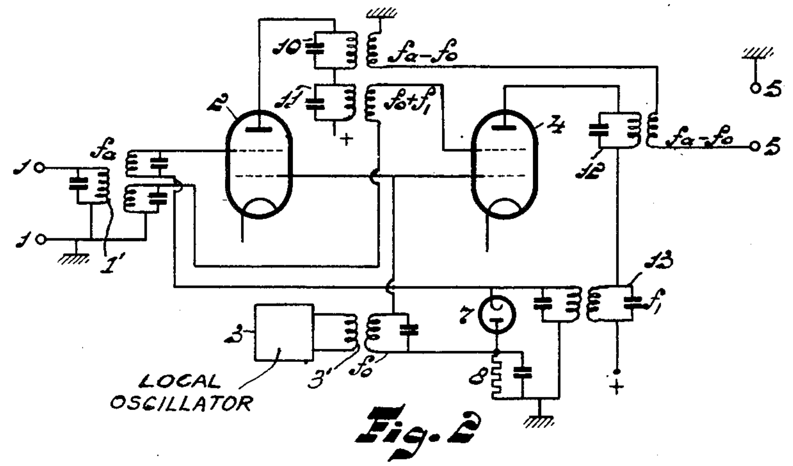
Figure 2A:
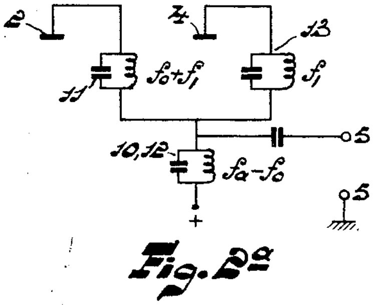
Figure 3:
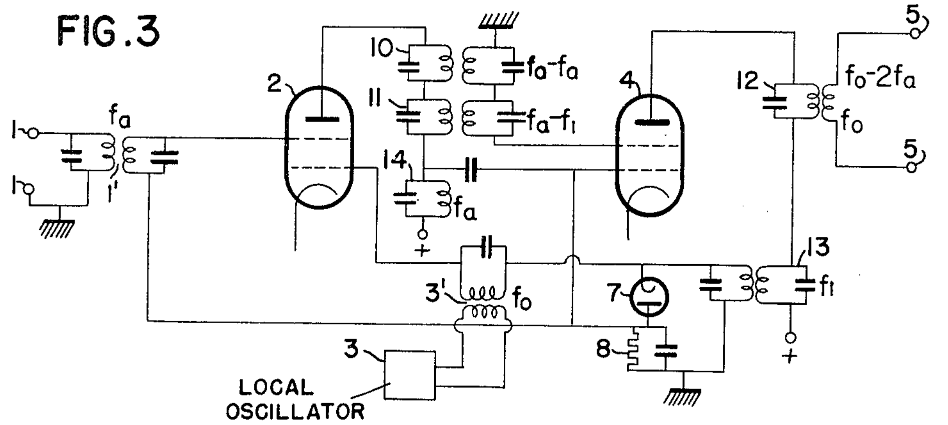
Figure 3A:
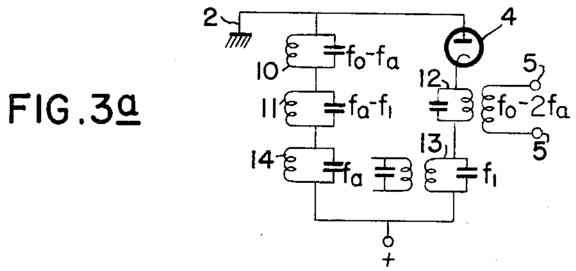
Figure 4:
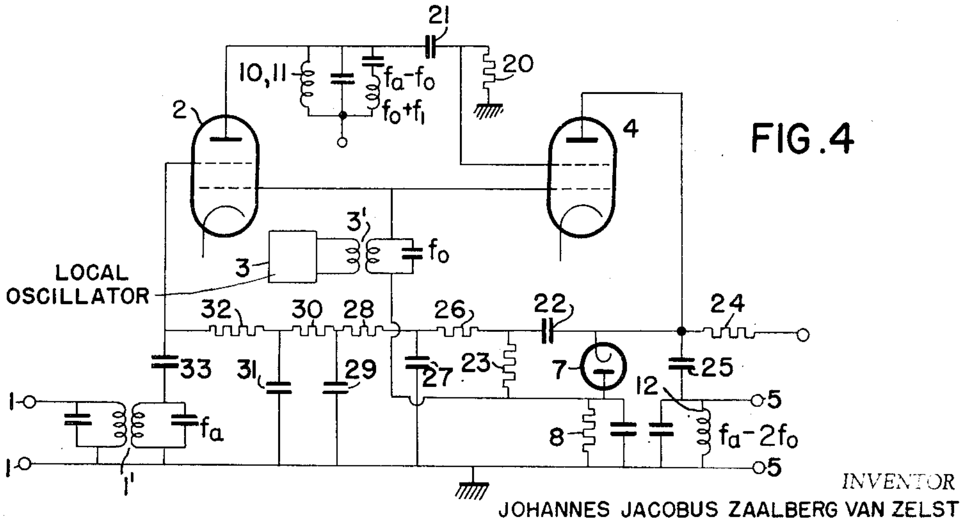

Figs. 1, 2 and 2*a* show schematically a circuit-arrangement for converting the control oscillation $f_a$ having a constant conversion slope;

Figs. 3 and 3*a* illustrate circuits for converting and limiting and, as the case may be, for discriminating; and Fig. 4 illustrates in what manner the influence of stray or variation in the impedances used in the circuit-arrangement may be reduced.

Fig. 1 shows a circuit-arrangement in which the control-oscillation of the frequency $f_a$ supplied to the input terminals 1, 1 of the tuned input transformer 1' is mixed in a mixing stage 2, for example a mixing tube (the circuit-arrangement is shown, for the sake of simplicity, only with tubes having two control-grids) with the oscillation of a frequency $f_0$ supplied by a local oscillator 3. Local oscillator 3 is coupled to the first grids of tubes 2 and 4 via transformer 3'. In the output of the mixing stage 2 is produced an oscillation of the frequency $f_a-f_0$, which is supplied to a second mixing stage 4, in which the frequency $f_0$ is again admixed. The converted oscillation $f_a-f_0$ is thus produced at the output terminal 5 of the circuit-arrangement.

In order to ensure that the conversion slope with which the control-oscillation $f_a$ is converted, should be constant, an auxiliary frequency $f_1$ is in addition supplied to the mixing stage 2. In the output of the mixing stage 2 is thus also produced an oscillation of the frequency $f_0+f_1$. This oscillation is also supplied to the mixing stage 4, so that by mixing this oscillation with the oscillation $f_0$ supplied by the local oscillator 3, the output circuit of the mixing stage 4 has produced across it an oscillation, the frequency of which equals that of the initial auxiliary oscillation $f_1$. By coupling the oscillation produced in the output of the mixing stage 4 with the input of the mixing stage 2 with the use of the circuits 13 tuned to the frequency $f_1$, the circuit-arrangement will self-oscillate at the auxiliary frequency $f_1$. For clearness' sake it is shown in the figures that the full secondary voltage of the circuits 13 is fed to the mixing stage 2; however, as a rule, a tapping will be provided on the secondary circuit, so that only a fraction $b$ of this voltage is supplied back. The mixing stages 2 and 4 are now invariably operated substantially at the same point of their conversion slope characteristic curve, since a control-voltage which is proportional to the amplitude of the auxiliary oscillation $f_1$ readjusts the conversion slope of these mixing stages. For this purpose provision is made of an amplitude detector, i. e. a diode 7 having an output circuit 8, the voltage across the output circuit 8 determining, for example, the negative adjustment of one or more control-grids of the mixing tubes 2 and/or 4. In Fig. 1, the output of the detector developed across R—C circuit 8 is shown as being applied to the first control grid in both tubes 2 and 4.

The conversion slope or transconductance of each stage, for example, mixing stage 2, is the ratio of the magnitude of a single beat component (in this case $f_a-f_0$) of the output electrode current to the magnitude of the control electrode voltage under the conditions that all direct electrode voltages and the magnitude of the local oscillations $f_0$ remain constant. It will be evident, therefore, that in order for the amplitude of the beat frequency component at the output terminals 5 to be proportional to the amplitude of the control oscillation $f_a$ and independent of variations in the conversion slope, it is essential that the conversion slope of the two stages be held constant.

To accomplish this purpose, a regenerative feedback path is provided including the tuned circuit 13, which path extends between the output circuit 12 of stage 4 and the input circuit 1' of stage 2 to produce regeneratively the auxiliary oscillation $f_1$. The auxiliary oscillation $f_1$ is mixed with local oscillation $f_0$ in stage 2 to produce at tuned circuit 11 the beat $f_0+f_1$, which beat is then mixed in stage 4 with local oscillation $f_0$ to yield the auxiliary oscillation $f_1$.

The amplitude of auxiliary oscillation $f_1$ yielded at the output of stage 4 will of course depend on the conversion slopes of the converter stages 2 and 4. In order, therefore, to maintain these slopes at the same point, the auxiliary oscillation $f_1$ at the output of stage 4 is rectified by diode 7 to produce across the resistance-capacitance network 8 a direct control voltage. This control voltage is applied via the secondary of transformer 3' to the grid circuits of stages 2 and 4 in a direction counteracting fluctuations in said conversion characteristics.

The operation of the circuit-arrangement may be explained as follows. It is assumed that the control-oscillation $f_a$ has an amplitude $A_a$, the auxiliary oscillation $f_1$ an amplitude $A_1$, and the local oscillation $f_0$ an amplitude $A_0$, while the mixing stage 2 has a conversion slope $C_2A_0$ and the mixing stage 4 a conversion slope $C_4A_0$, where $C_2$ and $C_4$ represent for stages 2 and 4 respectively, the ratio of the magnitude of a single beat frequency component of the output electrode current with respect to the magnitude of the control electrode voltage under the conditions that all direct electrode voltages as well as the magnitude of the local oscillations remain constant. In this case the output circuit of the mixing stage 2 will have produced across it, via the circuit 10, which is tuned to the frequency $f_a-f_0$ and which has an impedance $Z_{10}$ (if desired a transmission impedance $Z_{10}$) a voltage, the amplitude of which is equal to $C_2Z_{10}A_a.A_0$ (in which $C_2$ in itself may, moreover, be a function of $A_0$), whereas the circuit 11, having an impedance $Z_{11}$ and tuned to the frequency $f_0+f_1$, has produced across it a voltage, the amplitude of which is equal to $C_2Z_{11}A_0.A_1$. The voltage of the frequency $f_a-2f_0$ produced across the output circuit 12 of the mixing stage 4 having an impedance $Z_{12}$ thus exhibits an amplitude equal to $C_2C_4Z_{10}Z_{12}A_a.A_0^2$, whereas that produced across the circuit 11, having a tuning frequency $f_1$ and an impedance $Z_{13}$, will have an amplitude equal to $C_2C_4Z_{11}Z_{13}A_0^2A_1$. Since the oscillation of frequency $f_1$ is sustained in the circuit-arrangement by self-oscillating feed-back, the amplitude $A_1$ with which the auxiliary frequency $f_1$ is fed to the mixing stage 2 must be a constant fraction $b$ of that with which it is produced across the output of the mixing stage 4. From this it is ensured that: $A_1=b.C_2C_4Z_{11}Z_{13}A_0^2A_1$, from which it follows that, if the impedances Z are constant, $C_2C_4A_0^2$ is maintained constant by the control, so that the output of the mixing stage 4 has produced across it an oscillation of a frequency $f_a-2f_0$, the amplitude of which is independent of variations in the conversion slope of the mixing stages 2 and 4.

Fig. 2 shows a circuit-arrangement for measuring purposes, in which the two mixing stages 2 and 4 oscillate in cascade in the auxiliary frequency $f_1$ and are connected in series as a mixing stage for the input oscillations $f_a$.

The oscillations $f_a$, $f_0$ and $f_1$ are supplied to the mixing stage 2, so that the oscillations $f_a-f_0$ and $f_0+f_1$ are produced across the output circuit. Together with the input oscillation $f_a$, the oscillation $f_0+f_1$ is fed to the mixing stage 4, to which is fed in addition the local oscillation $f_0$. The mixing oscillation $f_a-f_0$ and the auxiliary oscillation $f_1$ are thus produced across the output of the mixing stage 4. By amplitude detection of the oscillation $f_1$, with the use of the diode 7 and its output filter 8, this filter has produced across it a control-voltage which readjusts the conversion slopes of the two mixing tubes.

As a self-oscillating condition for the auxiliary frequency $f_1$ we find: $A_1=bC_2C_4Z_{11}Z_{13}A_0^2A_1$, i. e. $C_2C_4A_0^2$ is constant. If the mean conversion slope of the two mixing stages is assumed to be $CA_0$, the conversion slope of one mixing stage is equal to $CA_0(1+e)$ and that of the other equal to $$\frac{CA_0}{1+e}$$

Since the oscillation fed to the output terminal 5 is formed by the sum of the voltages produced across the circuits 10 and 12, which voltages are equal to $C_2Z_{10}A_0.A_a$ and $C_4Z_{12}A_0.A_a$ respectively, the amplitude of the said voltage, if $Z_{10}$ and $Z_{12}$ are equal, will be given by:

$$Z_{10}A_0A_aC\left\{(1+e)+\frac{1}{1+e}\right\}=Z_{10}A_0A_aC\left\{2+\frac{e^2}{1+e}\right\}$$

If the two mixing stages do not differ excessively, so that $e$ remains small relatively to 1, the output voltage will be substantially independent of the conversion slope of the two mixing stages. With a ratio between the conversion slopes of 1 : 1.5, in which $e=0.22$, the divergence from the nominal value is found to be only 1%.

A similar circuit-arrangement is obtained, if the two mixing stages 2 and 3 self-oscillate in cascade in the auxiliary frequency $f_1$ and are connected in parallel as a mixing stage for the input oscillations. For this purpose the output circuits of the mixing stages need only be modified in such manner that, as is shown in Fig. 2*a*, the output currents jointly flow through the oscillatory circuit 10, 12, which is tuned to the frequency $f_a-f_0$.

In the circuit-arrangement of Fig. 1, the output voltage is also found to be independent of the amplitude of the oscillations locally produced. Conversely, the circuit-arrangement thus is also adapted for limiting and converting electrical oscillations (for example frequency-modulated oscillations), in which the output voltage is independent of any amplitude variations in the input voltage. Such a circuit-arrangement is shown in Fig. 3.

As before, the oscillations $f_a$, $f_0$ and $f_1$ are fed to the input of the mixing stage 2. The output circuit of this mixing stage has thus produced across it the oscillations $f_0-f_a$ and $f_a-f_1$, both of which are fed to the mixing stage 4, together with the oscillation $f_a$ which, if desired, may also be obtained from the output of the mixing stage 2 with the use of the circuit 14. The desired output oscillation of the frequency $f_0-f_a$ is thus produced across the output of the mixing stage 4 and, in addition, the regeneratively back-coupled auxiliary frequency $f_1$ is derived from this output circuit.

The amplitude with which the oscillation $f_0-f_a$ occurs across the output of the mixing stage 2 thus is $C_2Z_{10}A_0.A_a$ (in which, for a high value of $A_a$, $C_2$ may, in addition, be a function of $A_a$), that of the oscillation $f_a-f_1$ is $C_2Z_{11}A_aA_1$ and that of the oscillation $f_a$ is $S_2Z_{14}A_a$, $S_2$ representing the mutual conductance of the mixing tube 2, whereas the amplitude with which the oscillation $f_a-2f_a$ occurs across the output of the mixing stage 4 is equal to $S_2C_2C_4Z_{10}Z_{12}A_0A_a^2$ and that of the oscillation $f_1$ equal to $S_2C_2C_4Z_{11}Z_{13}Z_{14}A_1A_a^2$. For full oscillation of the frequency $f_1$ the condition is:

$$A_1=bS_2C_2C_4Z_{11}Z_{13}Z_{14}A_1A_a^2$$

so that, assuming the impedances Z to be invariable, the oscillation $f_0-2f_a$ produced across the output circuit of the mixing stage 4 exhibits an amplitude which only varies with the amplitude $A_0$ of the locally generated oscillations, which in themselves need not exhibit variations.

If $Z_{10}$ varies with the frequency sweep of the control-oscillation, i. e. if the coupled circuits 10 exhibit a frequency-dependent transmission ratio, as is the case with a discriminator network, the oscillation $f_0-f_2$ fed to the mixing stage 4 will exhibit an amplitude modulation which varies with and, for example, is proportional to the frequency sweep of the control-oscillation $f_a$. Consequently, the oscillation produced across the output of the mixing stage 4 will also exhibit a corresponding amplitude modulation. In this case the output of the mixing stage 4 may have obtained from it not only the oscillation $f_0-2f_a$ but also an oscillation of constant frequency $f_0$, the instantaneous amplitude of which is proportional to the frequency sweep of the input oscillations and independent of the amplitude modulation of these oscillations.

The circuit 11 tuned to the frequency $f_a-f_1$ and the circuit 14 tuned to the frequency $f_a$ may also exhibit a frequency-dependent transmission ratio, i. e. $Z_{11}$ or $Z_{14}$ varies with frequency. A frequency-dependent phase displacement across the circuit 11 or 14 will thus cause the auxiliary oscillation $f_1$ to be modulated in frequency, the frequency sweep of the auxiliary oscillation then becoming a function, determined by the networks 11, 13 and 14, of the frequency sweep of the input oscillations. Under certain conditions the frequency sweep of the auxiliary oscillation $f_1$ may be proportional to the frequency sweep of the input oscillation $f_a$, so that the mixing oscillation $f_a-f_1$ is, for example, fed back in frequency to a certain extent.

If the auxiliary oscillation $f_1$, moreover, exhibits an amplitude modulation which is proportional to the frequency sweep of the control-oscillation, the oscillation $f_0-2f_a$ produced across the output of the mixing stage 4 may exhibit a proportional amplitude modulation, which amplifies, as the case may be, the amplitude modulation produced by the frequency-dependent transmission ratio of the network 10.

In the circuit-arrangements shown, the value at which the conversion slope $C_2A_0$ is readjusted also varies with the aforesaid fraction $b$ by which the auxiliary frequency $f_1$ is attenuated before being regeneratively fed back to the input of the mixing stage 2. More particularly in measuring arrangements it may be desirable that this fraction should be dependent, to the smallest possible extent, on the circuit elements used. For this purpose the networks 11 and 13 in the channel of the auxiliary frequency $f_1$ may be built up from phase-shifting networks, for example comprising the cascade connection of sections, each section having a resistance and a reactance and producing an equal phase shift for the auxiliary oscillation, which may have been converted.

In the circuit-arrangement of Fig. 4, which corresponds to that of Fig. 1, for example the circuits 10 and 11 (which are, for example, united to constitute a network 10, 11) are damped by a grid leak 20, the output circuit of the mixing stage 4 comprising a phase-shifting network composed of the resistance-capacity sections 24, 25, 26, 27, 28, 29, 30, 31 and 32, 33, which sections, for example, do not load one another and each produce a phase-shift of $$\frac{360}{5}=72°$$

for the frequency $f_1$. The blocking condensers 21 and 22 and the grid leak 23 may, for example, be so proportioned that the circuit-arrangement does not self-oscillate in an undue lower auxiliary frequency. It is indicated in the simultaneously filed patent application 134,367 (PH. 10.003) that small variations or stray of the impedances comprised in the network have the least effect upon the readjustment of the amplification factor. It is, moreover, mentioned in this patent application, as a general formulation for such a network, that the quotient of the transmission impedance in the proximity of the auxiliary frequency and of the output resistance 20 or 24 must allow of being represented approximately by a whole negative power of a linear shape in frequency.

In the circuit-arrangement shown the mixing stages 2 and 4 are represented, for the sake of simplicity, by discharge tubes comprising two control-grids. However, in principle, use may be made of any arbitrary mixing stage such, for example, as a mixing diode or a magnetic modulator, provided that the energy amplification required for the self-oscillation of the auxiliary frequency $f_1$ is supplied, for example, with the use of an additional amplifying tube, the mutual conductance of which may, if necessary, be varied by the said control-voltage. Fig. 3*a*, for example, shows part of the circuit-arrangement of Fig. 3, in which the mixing stage 4 is constructed in form of a diode mixing tube.

The control indicated is invariably represented by a variation in the biasing voltage of one of the control-grids; as a rule, there will, however, be freedom in a multigrid tube, for example to control the two control-grids or the amplitude of the locally generated oscillation $f_0$. For example in a circuit-arrangement as shown in Fig. 3, use may, as an alternative, be made of two substantially identical mixing stages, for example diode mixing stages 2′ and 2″ (4′ and 4″ respectively), in which case, for example, the frequencies $f_a$ and $f_0$ are mixed in the mixing stage 2′ and the frequencies $f_a$ and $f_1$ in the mixing stage 2″ (or for example the frequencies $f_0-f_a$ and $f_a$ in the mixing stage 4′ and the frequencies $f_a-f_1$ and $f_a$ in the mixing stage 4″). If the mixing stages 2′ and 2″ (4′ and 4″ respectively) are substantially identical, the control-voltage produced across the filter 8 will readjust the conversion slopes of these stages in a similar manner as if only one mixing stage 2 or 4 were provided.

Instead of using two mixing stages 2 and 4 self-oscillating in cascade in the auxiliary frequency $f_1$, use may, as an alternative, be made of more stages, the auxiliary frequency $f_1$ then being converted in such manner that it is again generated across the output circuit of the last stage, it being possible to filter out at will sum or difference mixing frequencies in the intermediate stages with the use of networks which, as is already shown for the network 10, 11 in Fig. 4, need not be built up from the series combination of tuned circuits. Instead of taking the desired output oscillation inductively from the output of the last mixing stage, this may, as an alternative, often be effected capacitatively, for example by exchanging the circuits 12 and 13.

Under certain conditions, the frequency sweep of the auxiliary oscillation $f_1$ may also be a measure of the value of the control-voltage, the control-voltage then being produced across the output circuit of a frequency detector, to the input of which the auxiliary oscillation $f_1$ is supplied.

What I claim is:

1. A circuit-arrangement for controlling the frequency and amplitude of an electrical wave as a function of the amplitude and the frequency of a control oscillation comprising first and second frequency converter stages, means to apply as an input to the first stage said control oscillation and an auxiliary oscillation, means to derive from the output of said first stage a converted oscillation depending on the frequency of said auxiliary oscillation, means to apply said converted oscillation as an input to said second stage, means to derive from the output of said second stage a deconverted oscillatory voltage having a frequency equal to the frequency of said auxiliary oscillation, means coupling the output of said second stage to the input of said first stage to feed back positively said oscillatory voltage whereby said auxiliary oscillation is self-generated, detecting means coupled to the output of one of said stages for detecting said self-generated oscillation to produce a control voltage, and means to apply said control voltage to at least one of said stages to control the conversion slope thereof.

2. A circuit-arrangement for controlling the frequency and amplitude of an electrical wave as a function of the amplitude and frequency of a control oscillation comprising first and second frequency converter stages, means to apply as an input to said first stage said control oscillation and an auxiliary oscillation, means to derive from the output of said first stage at least one converted oscillation depending on the frequency of said auxiliary oscillation, a local oscillation source having a constant amplitude, means to apply said local oscillation and said converted oscillation as an input to said second stage, said local oscillation having a frequency at which there is yielded in the output of said second stage an oscillatory voltage having a frequency equal to the frequency of said auxiliary oscillation, a feedback path coupling the output of said second stage to the input of said first stage to feed back positively said oscillatory voltage whereby said auxiliary oscillation is self-generated, means coupled to the output of said second stage for detecting said oscillatory voltage to produce a control voltage depending thereon, and means to apply said control voltage to said first converter stage to maintain the conversion slope thereof constant.

3. An arrangement, as set forth in claim 2, further including a filter network in the output of said first stage discriminating against one of the converted oscillations produced by said first stage, said network being operated at a frequency at which the transmission characteristic curve exhibits an approximately linear dependency on frequency.

4. An arrangement, as set forth in claim 2, further including a respective filter network in the outputs of said first and second stages discriminating against a frequency appearing in the output of said stages, said networks operating at a frequency at which the phase varies with frequency in such manner that the auxiliary oscillation exhibits a frequency sweep which is proportional to the frequency sweep of the control oscillation.

5. An arrangement, as set forth in claim 2, wherein said feedback path includes a phase shifting network having a characteristic in the proximity of the auxiliary frequency at which the quotient of the transmission impedance and the output resistance of the network may be represented by a whole negative power of a linear form in frequency.

6. A circuit-arrangement for controlling the frequency and amplitude of an electrical wave as a function of the amplitude and frequency of a control oscillation comprising first and second frequency converter stages each including an electron discharge tube having a cathode, first and second control grids and an anode, means to apply to the first grid of said first stage said control oscillation and an auxiliary oscillation, resonant circuit means coupled to the anode of the tube in the first stage to derive therefrom a converted oscillation depending on the frequency of said auxiliary oscillation, a local oscillation source, means to apply said local oscillation to the second grids of the tubes in said first and second stages, means to apply said converted oscillation to the first grid of the tube in said second stage, said local oscillation source having a frequency at which there is yielded at the anode of the tube in said second stage an oscillatory voltage having a frequency equal to the frequency of said auxiliary oscillation, means coupling the anode in the tube of said second stage to the first grid in the tube of said first stage to feed back positively said oscillatory voltage whereby said auxiliary oscillation is self-generated, means coupled to the anode of the tube in said second stage for detecting said oscillatory voltage to produce a control voltage depending thereon, and means to apply said control voltage to the first grid in the tube of said first stage to maintain the conversion slope thereof constant.

References Cited in the file of this patent

UNITED STATES PATENTS

| Number | Name | Date |
|---|---|---|
| 2,265,083 | Peterson | Dec. 2, 1941 |
| 2,486,076 | Strutt et al. | Oct. 25, 1949 |

FOREIGN PATENTS

| Number | Country | Date |
|---|---|---|
| 528,061 | Great Britain | Oct. 22, 1940 |